United States Patent [19]
Kono

[11] Patent Number: 5,897,237
[45] Date of Patent: Apr. 27, 1999

[54] POWER TRANSMISSION MECHANISM FOR A SHEET SUPPLY APPARATUS

[75] Inventor: Takeshi Kono, Kawasaki, Japan

[73] Assignee: Canon Kabushiki Kaisha, Tokyo, Japan

[21] Appl. No.: 08/819,073

[22] Filed: Mar. 18, 1997

Related U.S. Application Data

[63] Continuation of application No. 08/390,667, Feb. 17, 1995, abandoned.

[30] Foreign Application Priority Data

| Feb. 22, 1994 | [JP] | Japan | 6-023985 |
| Mar. 10, 1994 | [JP] | Japan | 6-039665 |

[51] Int. Cl.⁶ .................................................. G03G 15/00
[52] U.S. Cl. ............................ 399/18; 192/126; 271/256; 399/20
[58] Field of Search ................................. 399/18, 20, 21; 271/256; 192/126, 127, 20

[56] References Cited

U.S. PATENT DOCUMENTS 5,459,553  10/1995  Kim .................................... 355/309 X

FOREIGN PATENT DOCUMENTS

| 505969 | 9/1992 | European Pat. Off. . |
| 577141 | 1/1994 | European Pat. Off. . |
| 629073 | 12/1994 | European Pat. Off. . |
| 2-192970 | 7/1990 | Japan . |
| 3-76677 | 4/1991 | Japan . |
| 3-83667 | 4/1991 | Japan . |
| 5-80594 | 4/1993 | Japan . |

*Primary Examiner*—William J. Royer
*Attorney, Agent, or Firm*—Fitzpatrick, Cella, Harper & Scinto

[57] ABSTRACT

The present invention provides a sheet supply apparatus with a supply device for supplying a sheet, a drive motor for driving the supply device, a power transmission switching mechanism for permitting or inhibiting transmission of power from the drive motor to the supply device, and control means for controlling an operation of the power transmission switching mechanism. The power transmission switching mechanism is controlled in such a manner that the transmission of power from the drive motor to the supply device is inhibited when a supplying operation is stopped.

55 Claims, 12 Drawing Sheets

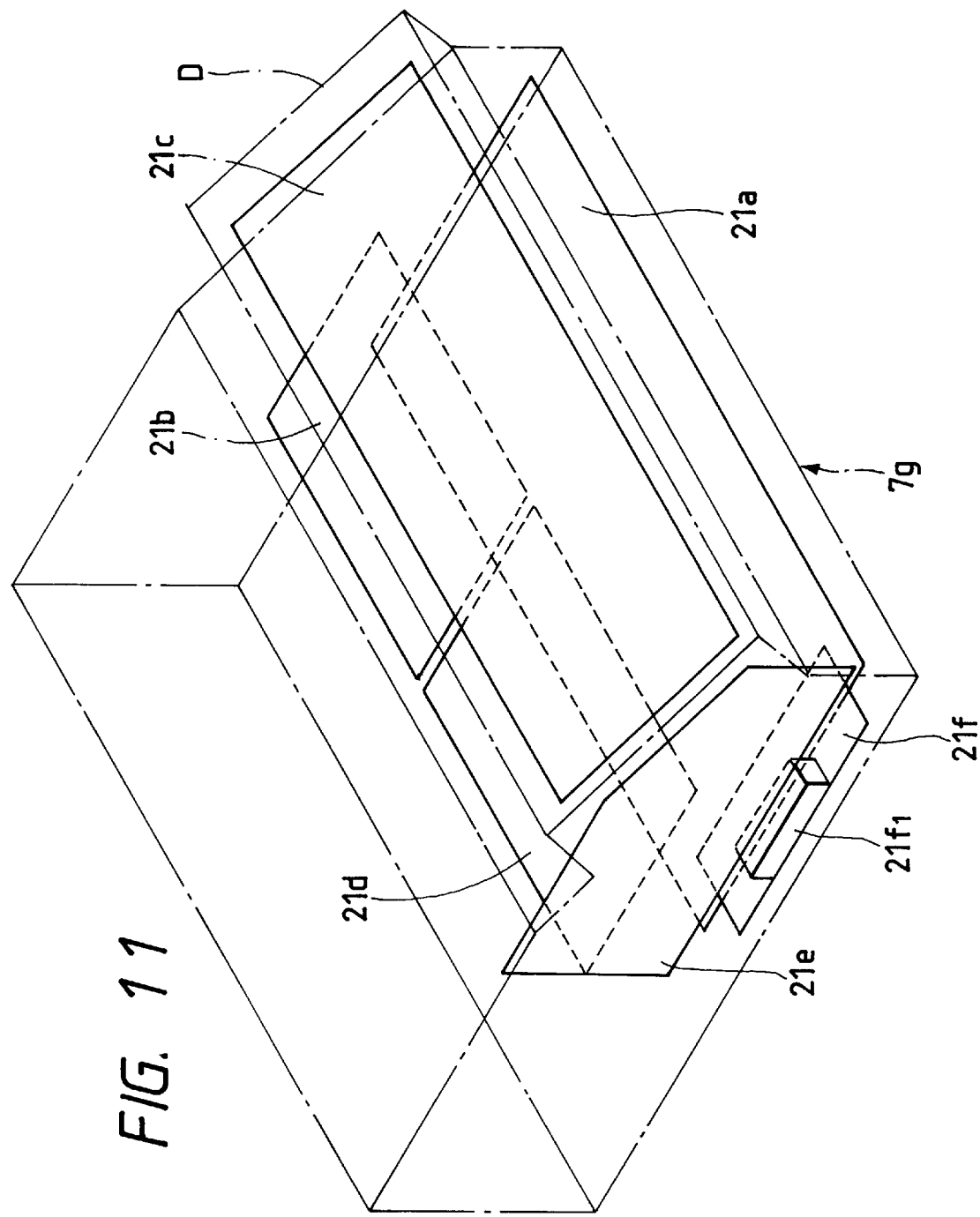

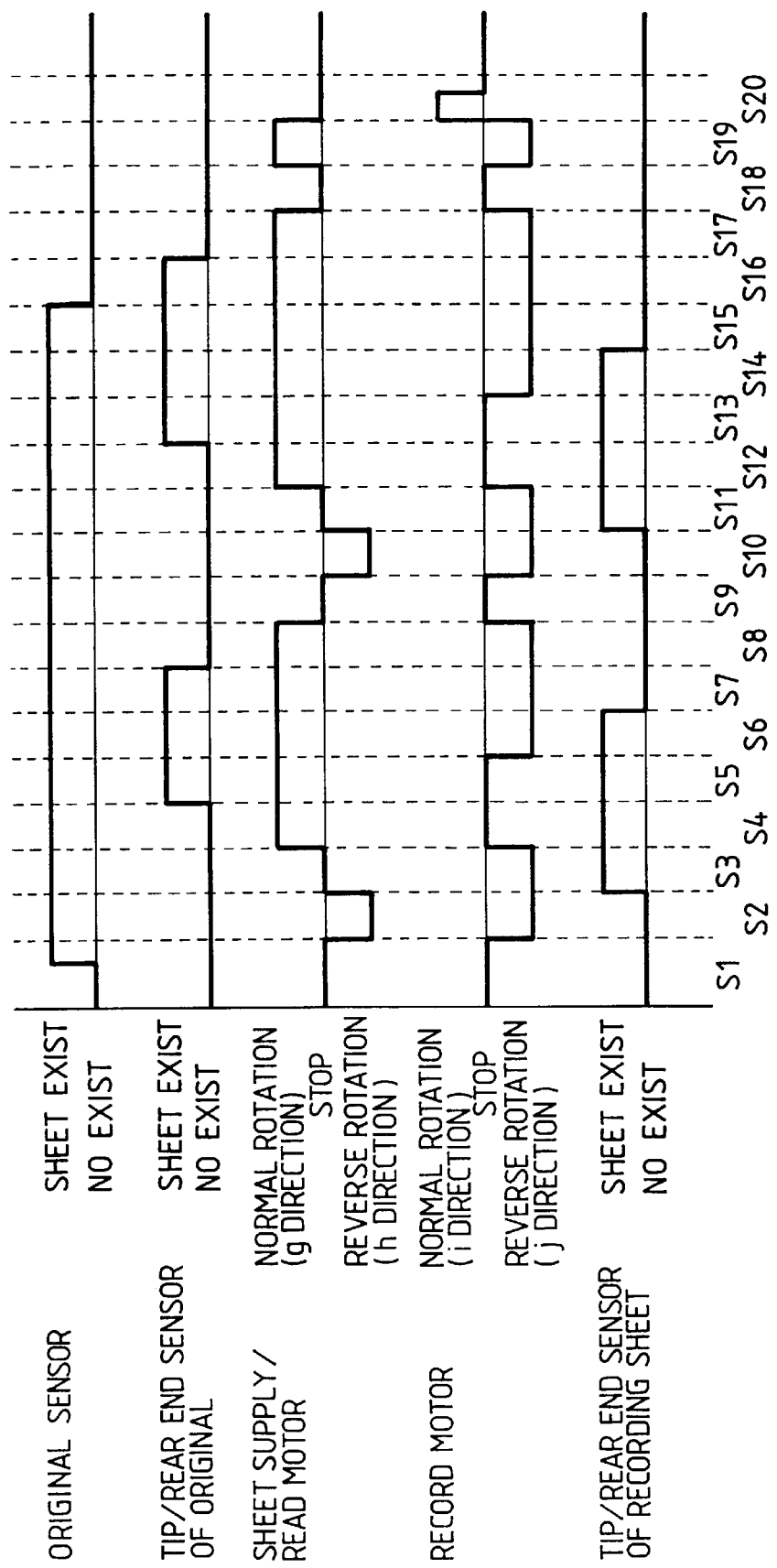

POWER TRANSMISSION MECHANISM FOR A SHEET SUPPLY APPARATUS

This application is a continuation of application Ser. No. 08/390,667 filed Feb. 17, 1995 now abandoned.

BACKGROUND OF THE INVENTION

1. Field of the Invention

The present invention relates to a sheet supply apparatus, and more particularly, it relates to a sheet supply apparatus having a mechanism for conveying, for example, an original sheet or a recording sheet having predetermined size.

2. Related Background Art

In recent years, facsimile systems has been widely used even in general homes, and, thus, higher additional functions have been requested. Among these functions, particularly, facsimile systems having an automatic sheet supplying function wherein a cut sheet (sheet having a predetermined size) can be used in place of a heat-sensitive recording sheet roll which has mainly been used in the prior art have been proposed.

In such facsimile systems capable of using the cut sheets, structural mechanisms driven by motors include an original convey means for conveying an original to a reading portion, a recording means for recording an image on a recording sheet, a sheet supply means for separating the recording sheets one by one and feeding the separated sheet to a recording means and the like. In order to drive these means in a predetermined manner, in the conventional facsimile systems, respective drive motors (stepping motors), drive circuits and drive power sources are provided for the original convey means, recording means and sheet supply means, respectively, to control these means independently.

However, in the above-mentioned conventional facsimile systems, if the sheet is jammed in a condition that the sheet is pinched between a sheet supply roller and a separation pad of the sheet supply means, in order to remove the jammed sheet, the jammed sheet must be pulled along a sheet conveying direction, or be pulled along a direction opposite to the sheet convey direction when it is difficult to pull the sheet in the sheet conveying direction. Although it is easy to pull the sheet in the sheet conveying direction, it is difficult to pull the sheet in the opposite direction, because the sheet supply roller is connected to a sheet supply motor via gears and a stopping torque of the sheet supply motor is great. Thus, it is considered that the separation pad can be released from the sheet supply roller. However, this results in cost-up and spacial inconvenience.

SUMMARY OF THE INVENTION

The present invention aims to eliminate the above-mentioned conventional drawback, and has an object to provide a sheet supply apparatus and a facsimile system, in which a jammed sheet can easily be removed.

To achieve the above object, a sheet supply apparatus according to the present invention comprises a convey means for conveying a sheet, a drive motor for driving the convey means, a power transmission switching mechanism for permitting or inhibiting transmission of power from the drive motor to the convey means, and a control means for controlling an operation of the power transmission switching mechanism. It is characterized in that the power transmission switching mechanism is controlled in such a manner that the transmission of power from the drive motor to the convey means is inhibited when the apparatus is stopped.

Another aspect of the present invention, there is provided a facsimile system comprising reading means for reading an image on an original, original supply means for supplying the original to the reading means, recording means for recording a predetermined image on a recording sheet, and recording sheet supply means for supplying the recording sheet to the recording means. It further comprises shift means selectively engageable with either a power transmitting mechanism for the original supply means or a power transmitting mechanism for the recording sheet supply means, a drive motor for selectively driving the original supply means or the recording sheet supply means via the shift means, and control means for controlling an operation of the drive motor, and wherein the shift means is positioned at a neutral position where the shift means is not engaged with both of the power transmitting mechanisms for the original supply means and for the recording sheet supply means when an operation of the system is stopped.

With this arrangement, since the drive motor is disconnected from the power transmitting mechanisms of the supply means when the system is stopped, a load caused by a stopping torque of the drive motor does not act on the supply means, and, thus, a jammed sheet can easily be removed.

Further, since there is no need to provide an additional releasing mechanism for the separation pad, the system can be made cheaper and a space can be saved.

BRIEF DESCRIPTION OF THE DRAWINGS

FIG. 11 is a perspective view of showing an arrangement of circuit boards;

FIG. 13 is a timing chart for controlling motors of the facsimile system.

DETAILED DESCRIPTION OF THE PREFERRED EMBODIMENTS

FIRST EMBODIMENT

Figure 1:
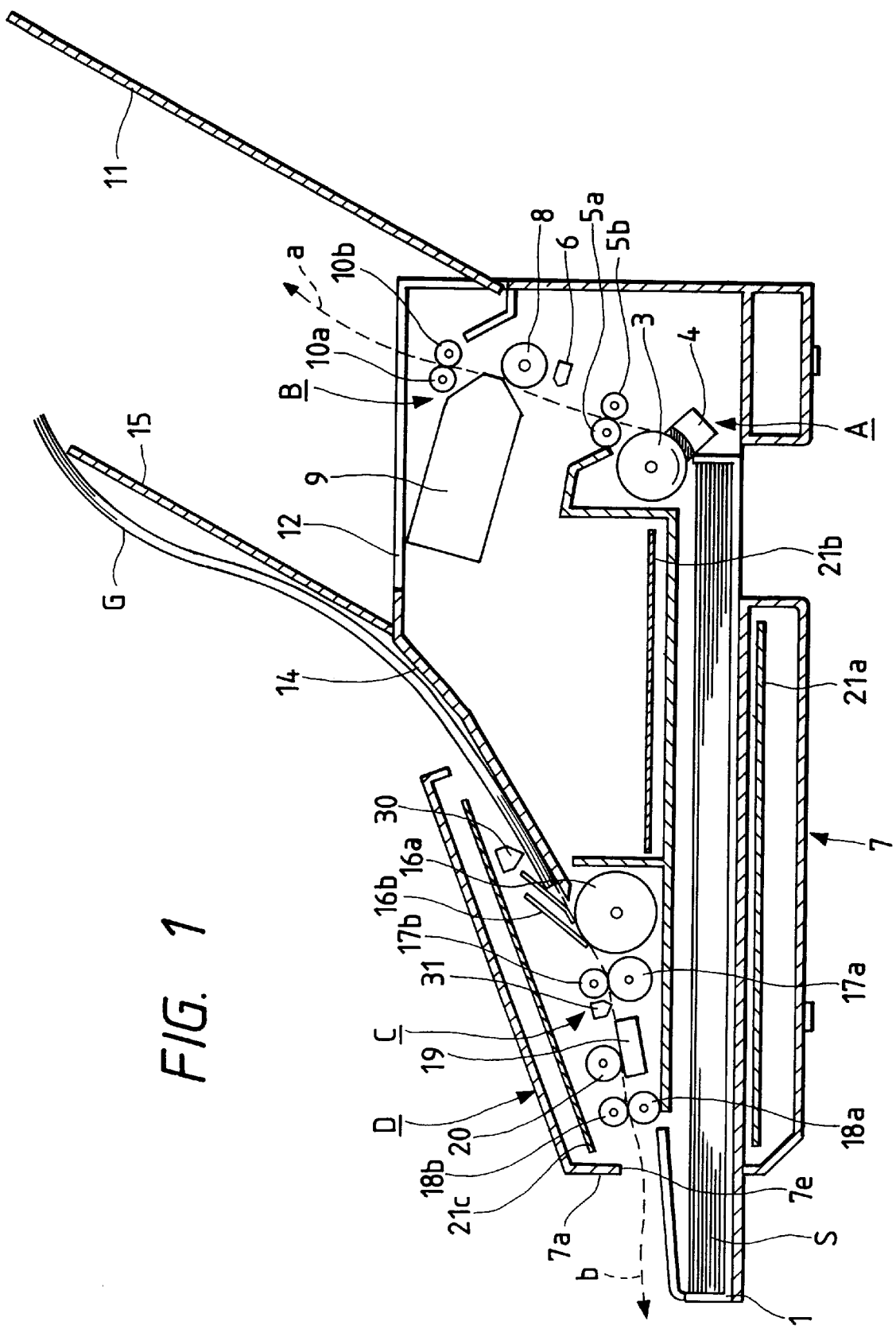
FIG. 1 is a sectional view of a facsimile system according to a first embodiment of the present invention.
Figure 2:
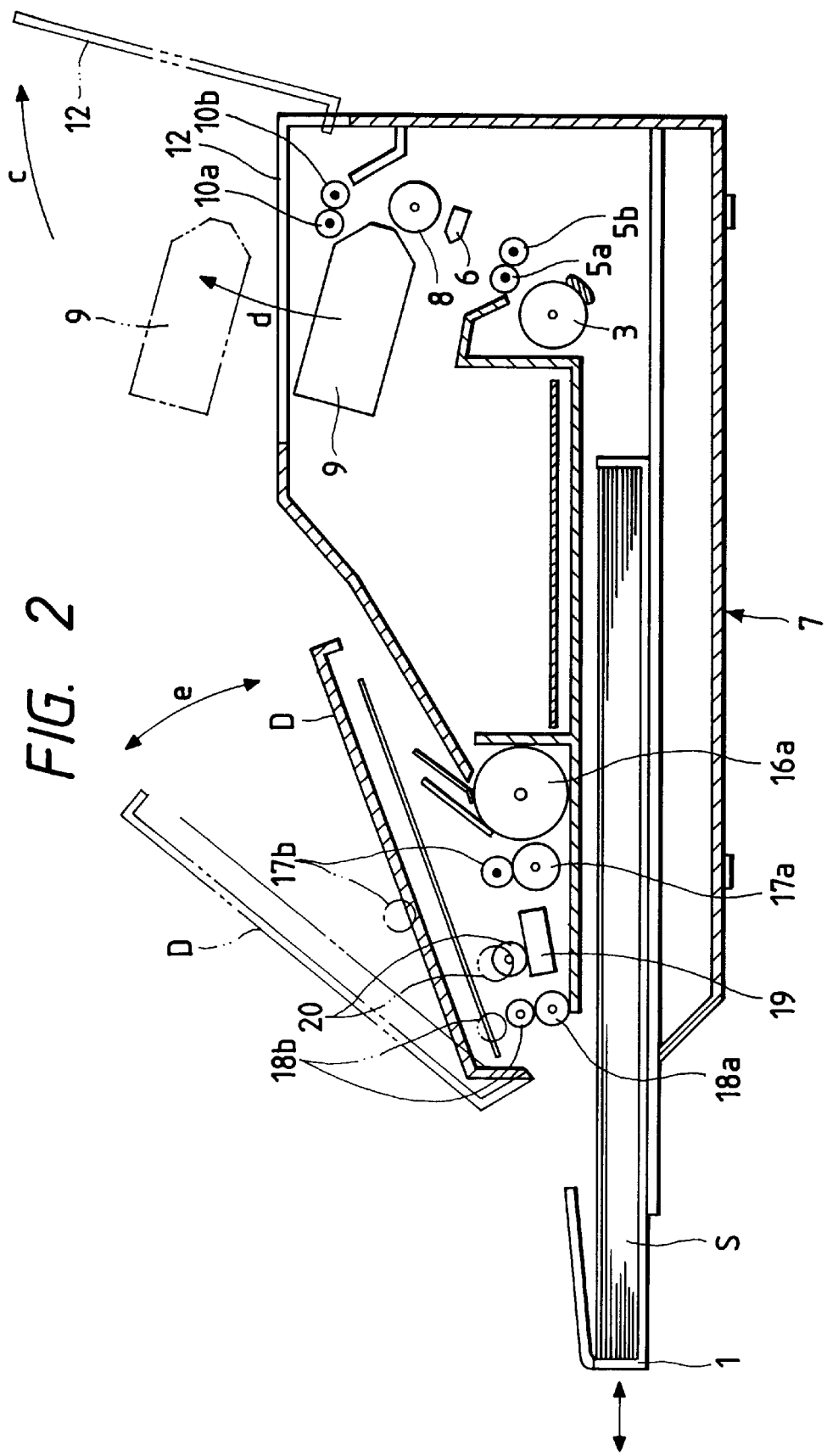
FIG. 2 is a sectional view for explaining an operation of the facsimile system.

Now, a facsimile system according to a first embodiment of the present invention will be explained with reference to the accompanying drawings. FIG. 1 is a sectional view showing a main portion of a facsimile system according to the first embodiment in which an ink jet recording means of serial type is used as a recording means. Further, FIG. 2 is a view for explaining an operation of the facsimile system.

Entire Construction of the Facsimile System

First of all, in FIGS. 1 and 2, the entire construction of the facsimile system will be explained. As shown in FIG. 1, the facsimile system comprises a sheet supply system A for supplying recording sheets S one by one, a recording system B acting as a recording apparatus, a reading system C for reading an image on an original, and an operating portion D.

Sheet Supply System

The sheet supply system A serves to separate recording sheets S stacked in a cassette 1 one by one at a sheet supply portion comprised of a sheet supply roller 3 and a separation pad 4, thereby supplying the separated recording sheet toward a downstream direction and to convey the recording sheet further downwardly (in a direction shown by the arrow a) to the recording system B by means of a pair of feed rollers 5a, 5b. A sheet tip/rear end 6 comprising a photo sensor or a micro-switch for detecting tip and rear ends of the recording sheet S to ascertain a position of the recording sheet S is arranged in front of the recording system B for recording an image on the recording sheet S supplied from the sheet supply system.

On the other hand, as shown in FIG. 2, the cassette 1 can be mounted to and dismounted from the facsimile system through an opening 7e formed in a front surface 7a of a system body 7 (FIG. 1) having an inclined upper surface. Further, the sheet supply roller 3, separation pad 4, feed rollers 5a, 5b and sheet tip/rear sensor 6 are arranged at attachment portions (not shown) formed within the system body 7, respectively.

Recording System

The recording system B serves to record the image on the recording sheet S supplied from the sheet supply system A, in response to an image signal sent from an external device, an image signal sent from the reading system C or a predetermined data outputted from a computer and the like. More particularly, the recording sheet S is conveyed in the downstream direction by a platen roller 8 of the recording system B, and one-line recording is effected by discharging ink droplets from a head cartridge 9 toward the recording sheet S in response to the image signal or the predetermined date. The conveyance of the recording sheet and the one line recording are repeated alternately.

Then, the recording sheet S on which the image was recorded is further conveyed in the direction a and is further conveyed in the downstream direction by a pair of discharge rollers 10a, 10b to be discharged onto a sheet tray 11 disposed out of the facsimile system. The platen roller 8 of the recording system B and the discharge rollers 10a, 10b are arranged at attachment portions (not shown) formed within the system body 7, respectively. The head cartridge 9 for effecting the recording can be mounted to and dismounted from the body 7 of the facsimile system along directions d by opening a record cover 12 toward a direction c to an opened position (shown by the two-dot and chain line in FIG. 2).

Reading System

The reading system C serves to convert light illuminated on an original G (FIG. 1) into an electric signal which is in turn sent to other facsimile system or to the above-mentioned recording system B in response to requirement of the facsimile system. That is to say, a single original or a plurality of originals G are stacked on an original stacking plate 14 and an original tray 15, and the originals G are separated one by one by means of a separation roller 16a and an urging piece 16b urged against the separation roller. The separated original is sent toward a downstream direction (in a direction shown by the arrow b in FIG. 1) and is further conveyed by a pair of convey rollers 17a, 17b and a pair of discharge rollers 18a, 18b to be discharged out of the system through the opening 7e of the system body 7.

While the original G is being conveyed in this way, the image information is read by a reading portion comprised of a photo-electric conversion element (for example, a contact sensor) 19 and a white roller 20 for defining the background for reading. In a copy mode, the image signal is sent to the reading system B; whereas, in a sending mode, the image signal is sent to a recording system of other facsimile system.

Further, an original presence/absence sensor 30 for detecting the presence or absence of the original to determine whether the original is in a readable condition or not is arranged in the proximity of the upstream side of the separation roller 16a, and an original tip/rear end sensor 31 comprised of a photo-sensor or a micro-switch for detecting tip and rear ends of the original G to set a timing of the start and finish of the reading operation of the photo-electric conversion element 19.

The original stacking plate 14, original tray 15, separation roller 16a, convey roller 17a, discharge roller 18a, photo-electric conversion element 19 and white roller 20 are arranged at attachment portions (not shown) formed within the system body 7, respectively.

Operating Portion

The operating portion D serves to perform a mode switching operation, a copying operation, a sending operation, a printing operation and the like. The operating portion is arranged on the inclined front upper portion and has various keys (not shown) associated with the above-mentioned operations.

The operating portion D disposed above the original conveying mechanism of the reading system C and can be opened or rocked with respect to the system body 7 in directions shown by the arrow e in FIG. 2. Incidentally, although not shown, a telephone (hand set) is arranged at one side of the operating portion D.

In this way, various constructional portions required for the facsimile system can be arranged within the body 7 of the facsimile system with compactness, and the exchange of the head cartridge 9, access to the reading portion and exchange of the sheet supply cassette 1 can easily be performed.

Incidentally, the reference numeral 21a denotes a system substrate; 21b denotes a power source unit substrate; 21c denotes a control substrate. These substrates are arranged at predetermined positions. Further, as well as the above-mentioned substrates, a relay substrate, a substrate for controlling the telephone and a telephone line (not shown), a substrate on which a printer interface is mounted and the like are also arranged at predetermined positions. By providing various electronic circuit boards (substrates) in this way, a heat generating problem can be eliminated and maintenance can easily be performed.

Construction of Drive System

Figure 3:
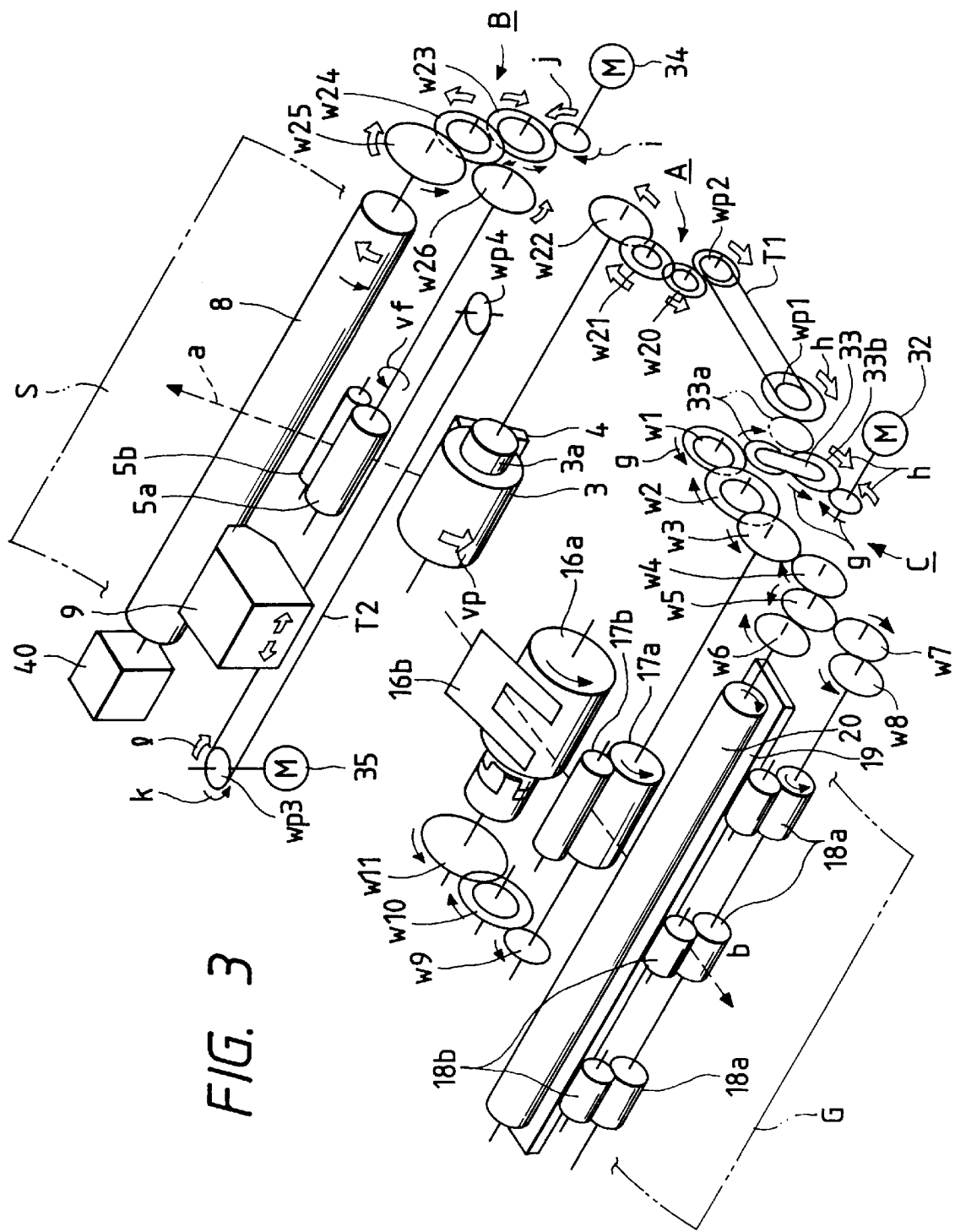
FIG. 3 is a schematic perspective view of a drive system of the facsimile system.

Next, a construction of the drive system will be explained with reference to FIG. 3 which is a schematic perspective view showing the drive system. In FIG. 3, as drive sources, there are provided a sheet supply/read motor 32 for driving the sheet supply system A and the reading system C, a record motor 34 for effecting the conveyance of the sheet in the recording system B and driving a cleaning device 40 for cleaning a head of the head cartridge 9, and a carriage motor 35 for shifting the head cartridge 9 in a main scan direction. Accordingly, the facsimile system has three stepping motors in total.

Among these stepping motors, regarding the sheet supply/read motor 32, when the motor 32 is rotated in either direction, a switching arm 33 is rotated or rocked accordingly, so that the power of the motor 32 is transmitted to either of the sheet supply system A or the reading system C.

Figure 4:
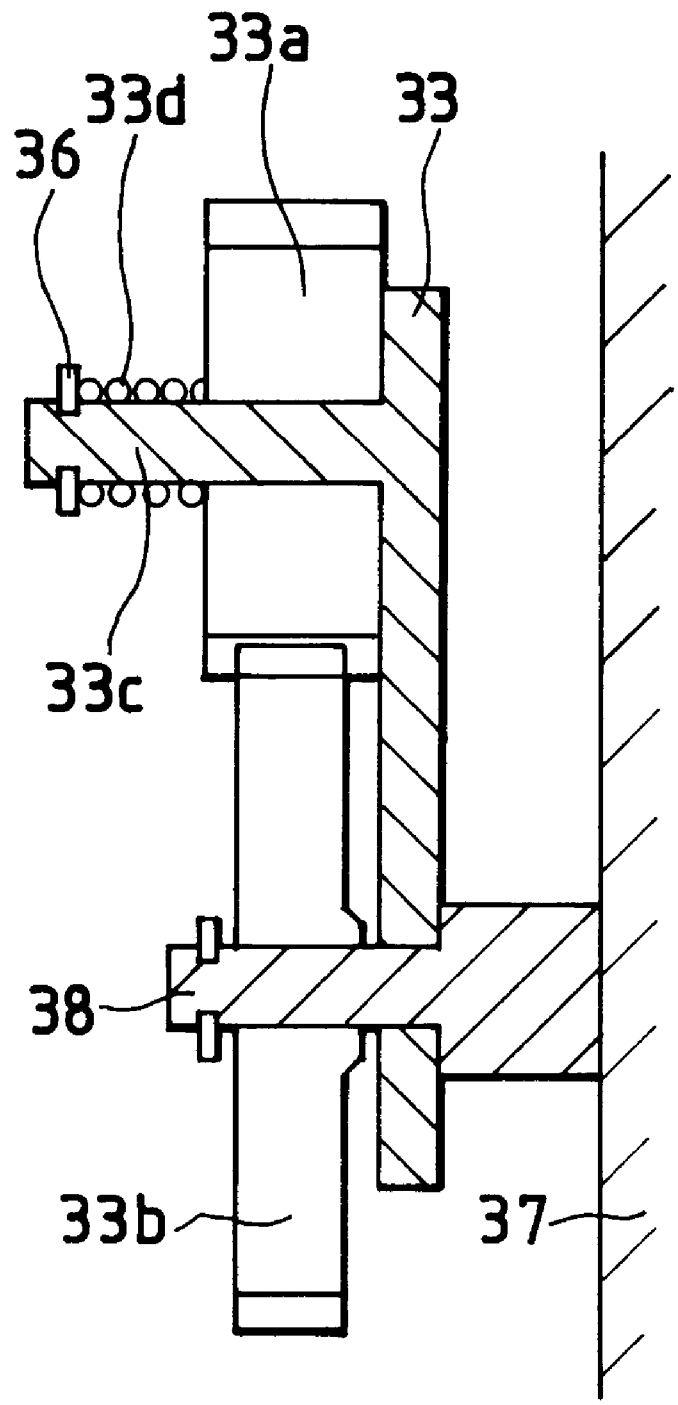
FIG. 4 is a sectional view showing a main portion of a switching mechanism in the drive system.

As shown in FIG. 4, a switching gear 33a is rotatably mounted on a shaft 33c secured to the switching arm 33 so that the switching gear can be moved together with the switching arm 33. On the other hand, the switching gear 33a is urged against the switching arm 33 by a coil spring 33d compressed between a stop ring 36 attached to the shaft 33c and the switching gear, thereby generating a friction force between the switching arm 33 and the switching gear 33a to provide a predetermined weak rotational load.

The switching arm 33 and a rotation center gear 33b are rotatably supported on a shaft 38 secured to a drive base 37 so that a distance between the switching gear 33a and the rotation center gear 33b is kept constant and these gears are always meshed with each other.

With this arrangement, when the rotation center gear 33b is rotated by the sheet supply/read motor 32, the switching gear 33a becomes stationary with respect to the switching arm 33 due to the rotational load, with the result that the switching arm 33 is rocked around the rotation center gear 33b in the rotational direction. As a result, since the switching gear 33a is engaged by another gear to stop the rocking movement of the switching arm 33, the switching gear 33a is rotated by rotation of the rotation center gear 33b to transmit the power. That is to say, by rotating the sheet supply/read motor 32 in a direction shown by the arrow g in FIG. 3, the reading system C is driven, thereby driving gears w1–w11. On the other hand, when the sheet supply/read motor 32 in a direction shown by the arrow h, the sheet supply system A is driven to drive a gear pulley wp1, thereby driving a gear pulley wp2 and gears w20–w22 meshed with the gear pulley via a belt T1 to rotate the sheet supply roller 3.

On the other hand, in the recording system B, the cleaning device 40 has a similar power switching mechanism so that, when the record motor 34 is rotated in a direction shown by the arrow i, the cleaning device 40 is driven through gears w23–w25, and, when the record motor 34 is rotated in a direction shown by the arrow j, the recording sheet S is conveyed through gears w23–w26.

The carriage motor 35 drives a timing belt T2 secured to a carriage (not shown) of the head cartridge 9 through pulleys wp3, wp4 so that, when the carriage motor 35 is rotated in a direction shown by the arrow k, the cartridge 9 is shifted to the left, and, when the carriage motor 35 is rotated in a direction shown by the arrow l, the cartridge 9 is shifted to the right. In response to the shifting movement of the cartridge, an ink jet recording operation is effected to record the image on the recording sheet.

A relation between a peripheral speed Vf of the feed rollers 5a, 5b and a peripheral speed Vp of the sheet supply roller 3 is selected to be Vf>Vp, and a one way clutch 3a is arranged between the sheet supply roller 3 and a drive shaft to which the gear w22 is secured, so that, when the recording sheet separated and supplied by the sheet supply roller 3 is started to be conveyed by the feed rollers 5a, 5b, the sheet supply roller 3 is rotatingly driven by the movement of the recording sheet S. As a result, as the recording sheet is conveyed by the feed rollers 5a, 5b, even when the sheet supply system A is stopped, the recording sheet S can be conveyed by the recording system B.

Construction of Control System

Next, the control system for controlling the above-mentioned various systems will be explained with reference to a block diagram of FIG. 5.

Figure 5:
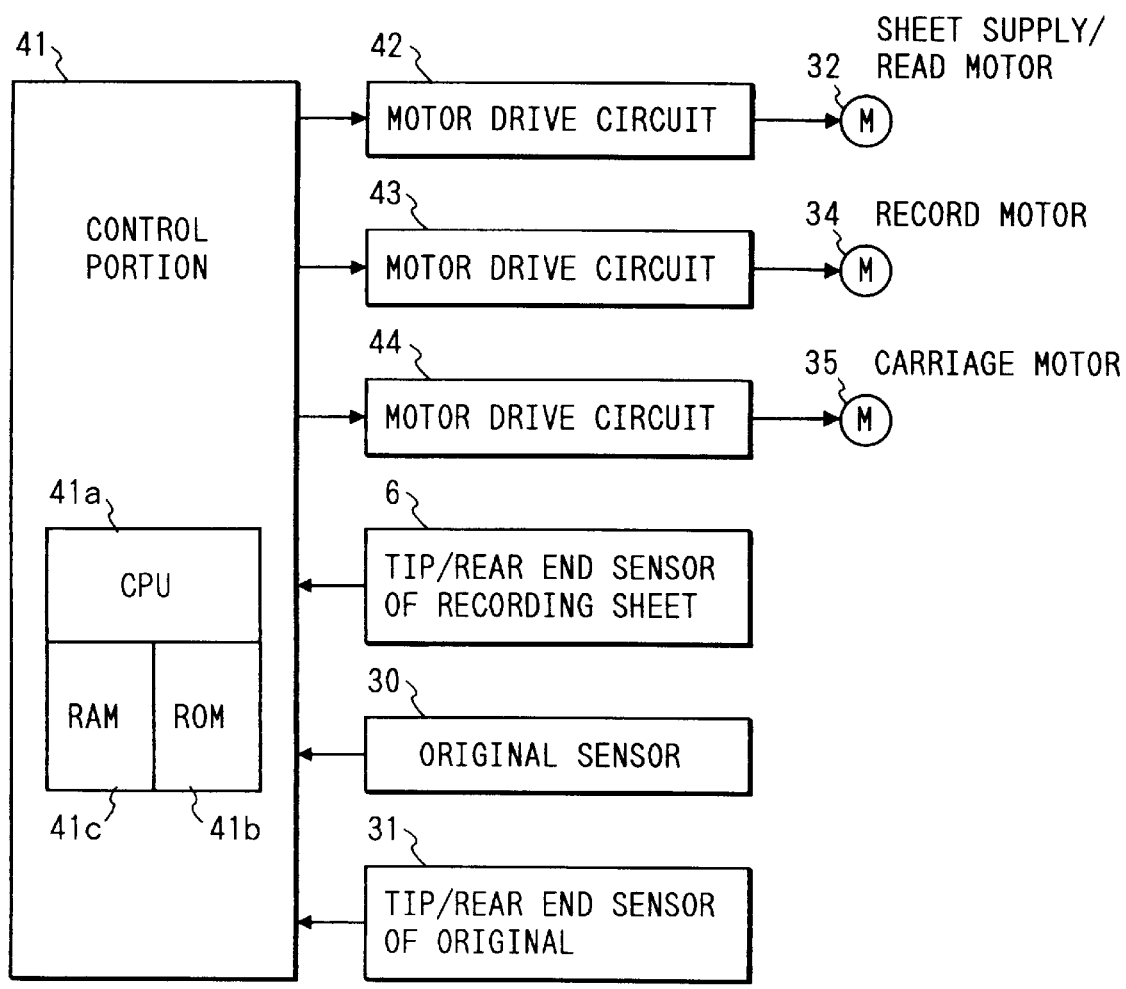
FIG. 5 is a block diagram of a control system of the facsimile system.

In FIG. 5, a control portion 41 of the facsimile system has a CPU 41a for controlling the entire system, a ROM 41b for storing various programs and various data, and a RAM 41c for temporarily storing various data and used as a work area for the CPU 41a.

Motor drive circuits 42, 43, 44 for driving the sheet supply/read motor 32, record motor 34, carriage motor 35 are connected to the control portion 41, and, when control signals are sent from the control portion 41 to the motor drive circuits 42, 43, 44, the motors 32, 34, 35 are driven, respectively. Incidentally, in the illustrated embodiment, while an example that the stepping motors are used as the drive motors was explained, the present invention is not limited to such an example, but DC motors or servo motors can be used, for example.

Further, the recording sheet tip/rear end sensor 6, original presence/absence sensor 30 and original tip/rear end sensor 31 are connected to the control portion 41 so that detection signals from the sensors can be inputted to the control portion.

Example of Drive Control for Motors

Next, in the above-mentioned facsimile system, operations of various motors when the images on two originals are successively copied will be explained with reference to a timing chart shown in FIG. 6.

(S1): when two originals G are set on the original stacking plate 14, the original presence/absence sensor 30 detects the fact that the original is present, and a copy permitting condition or an original image sending permitting condition is established.

(S2): when the copy start is commanded from the operating portion D, the sheet supply/read motor 32 is rotated in the direction h, with the result that the sheet supply roller 3 is rotated to start the supply of the recording sheet. At the same time, the record motor 34 is rotated in the direction j to rotate the feed rollers 5a, 5b and the platen roller 8, thereby conveying the recording sheet S supplied from the sheet supply system A.

(S3): when the tip end of the sheet is detected by the recording sheet tip/rear end sensor 6, since the recording sheet S can be conveyed only by the record motor 34, the sheet supply/read motor 32 is stopped.

(S4): by conveying the recording sheet S by a predetermined amount after the tip end of the sheet was detected in S3, the registration of the recording sheet S with respect to the recording position is completed. At this point, the record motor 34 is stopped. Further, the sheet supply/read motor 32 is rotated in the direction g to start the separation of the original G.

(S5): the tip end of the first original G is detected by the original tip/rear end sensor 31.

(S6): when the original G is conveyed by a predetermined amount after the tip end of the original was detected in S5, since the tip end of the original G reaches the reading position of the photo-electric conversion element 19, the reading operation is started and the image signal is sent to the recording system B. When the image signal is received by the recording system B, the record motor 34 is rotated in the direction j to convey the recording sheet S; meanwhile, by rotating the carriage motor 35 in the normal and reverse directions alternately, the predetermined serial recording operation is effected by the head cartridge 9.

(S7): the rear end of the recording sheet S is detected by the sheet tip/rear end sensor 6.

(S8): the rear end of the first original G is detected by the original tip/rear end sensor 31.

(S9): the tip end of the second original G is detected by the original tip/rear end sensor 31.

(S10): when the rear end of the recording sheet S is conveyed by the predetermined amount to reach the recording position after the rear end of the recording sheet is detected in S7, the record motor 34 is stopped. Similarly, when the rear end of the first original G is conveyed by the predetermined amount to reach the reading position after the rear end of the original was detected in S8, the sheet supply/read motor 32 is stopped.

(S11): similar to S2, the sheet supply/read motor 32 is driven to start the sheet supplying operation. At the same time, the record motor 34 is driven to discharge the first recording sheet S and to convey the second recording sheet S supplied from the sheet supply system A.

(S12): similar to S3, when the tip end of the second recording sheet S is detected by the recording sheet tip/rear end sensor 6, since the recording sheet S can be conveyed only by the record motor 34, the sheet supply/read motor 32 (sheet supply system A) is stopped.

(S13): similar to S4, after the registration of the second recording sheet S is completed, the record motor 34 is stopped, and the sheet supply/read motor 32 is rotated in the direction g to convey the second original G.

(S14): the conveyed amount of the second original (including the conveyed amount in S9) is counted, and, when the tip end of the second original G reaches the reading position, the reading operation is started. Further, similar to S6, the predetermined recording operation is effected in the recording system B.

(S15): similar to S7, the rear end of the second recording sheet S is detected by the sheet tip/rear end sensor 6.

(S16): the second original G is also conveyed, and the fact that there is no remaining originals is detected by the original presence/absence sensor 30.

(S17): similar to S8, the rear end of the second original G is detected by the original tip/rear end sensor 31.

(S18): similar to S10, the recording operation and the reading operation are stopped. When the rear end of the recording sheet S is conveyed by the predetermined amount to reach the recording position, the record motor 34 is stopped. When the rear end of the original G is conveyed by the predetermined amount to reach the reading position, the sheet supply/read motor 32 is stopped.

(S19): the record motor 34 is rotated in the direction j by the predetermined amount to discharge the rear end of the recording sheet S from the recording system B. At the same time, the sheet supply/read motor 32 is rotated in the direction g to discharge the rear end of the last original G.

(S20): the record motor 34 is rotated in the direction i by the predetermined amount, so that the recording head portion of the head cartridge 9 is cleaned by the cleaning device 40.

(S21): the sheet supply/read motor 34 is rotated in the direction h by the predetermined amount so that the switching gear 33a of the switching arm 33 is brought to the neutral position where the gear 33a is not engaged with both of the gear w1 of the reading system and the gear pulley wp1 of the sheet supply system.

In accordance with the above-mentioned operations, the copy mode is carried out. On the other hand, in the sending mode, only the reading operation for reading the original G is effected. Thus, the sheet supply/read motor 32, original presence/absence sensor 30 and original tip-rear end sensor 31 are operated in the same manner as mentioned above, thereby carrying out the sending mode.

On the other hand, in the receiving mode, only the supplying operation and the recording operation regarding the recording sheet are effected. Thus, the sheet supply/read motor 32, record motor 34 and sheet tip/rear end sensor 6 are operated in the same manner as mentioned above, thereby carrying out the receiving mode. In this case, however, in the above S21, the sheet supply/read motor 32 is rotated in the direction g.

Further, if abnormity occurs during the sheet supplying operation (for example, if the tip end of the recording sheet S is not detected by the sheet tip/rear end sensor 6 even after the sheet supply/read motor 32 and the record motor 34 were driven by the predetermined time period in the above S2), the sheet supply/read motor 32 is rotated in the direction g by the predetermined amount as is in the above S21, thereby bringing the switching gear 33a to the neutral position.

As a result, since the load caused by the stopping torque of the sheet supply/read motor 32 does not act on the sheet supply roller 3, even if the sheet is jammed during the sheet supplying operation, the jammed recording sheet S can easily be pulled in the sheet supplying direction or in the opposite direction.

SECOND EMBODIMENT

Next, a facsimile system according to a second embodiment of the present invention will be explained. Incidentally, since the construction of the facsimile system according to the second embodiment is the same as that in the first embodiment, explanation thereof will be omitted. Now, the controlling operation of the second embodiment will be described with reference to FIGS. 3 and 6 used in connection with the first embodiment.

In this second embodiment, in each of the copy mode, sending mode and receiving mode, when the operations are stopped, the sheet supply/read motor 32 is controlled so that the switching gear 33a is engaged by either the gear w1 of the reading system or the gear pulley wp1 of the sheet supply system.

Figure 6:
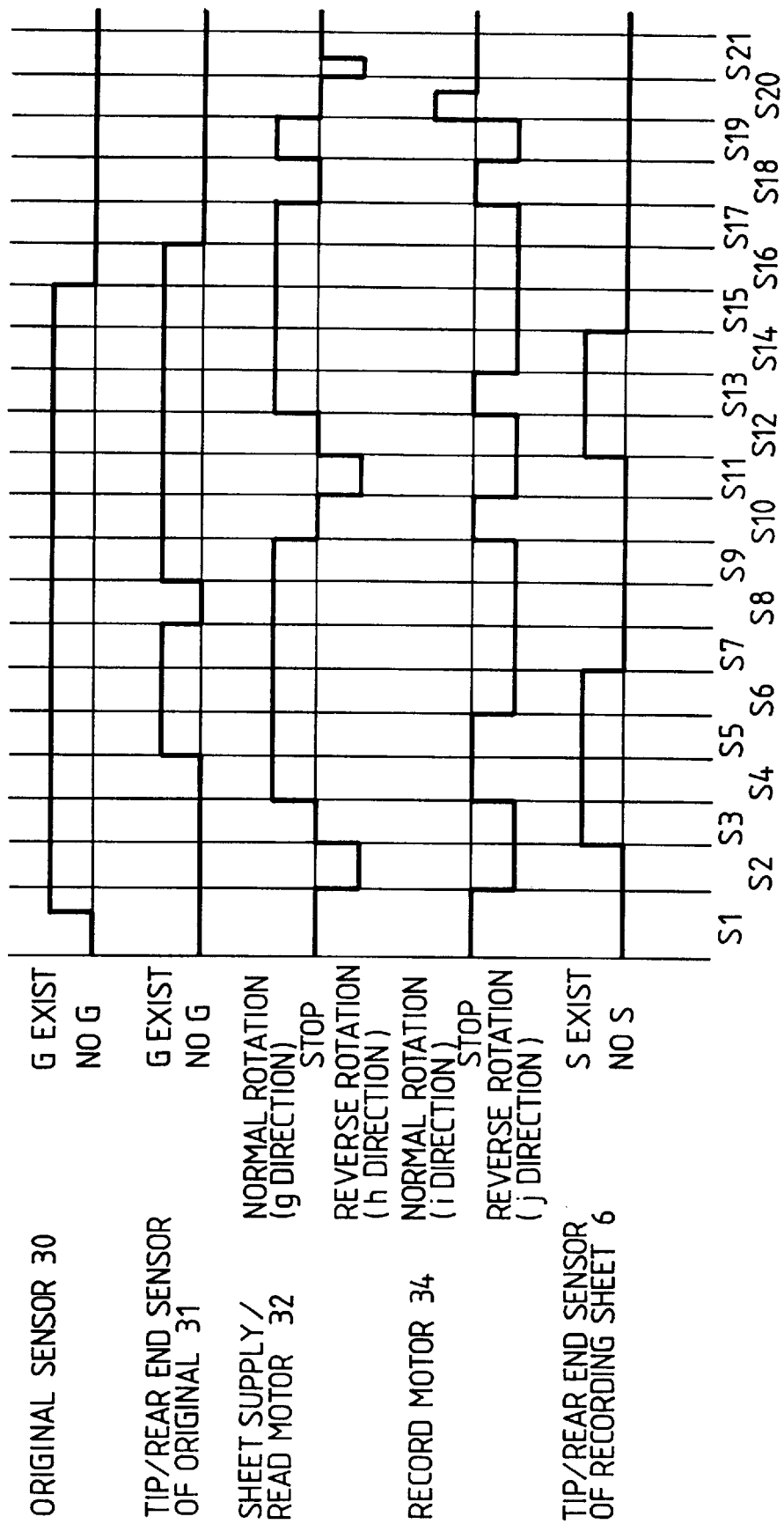
FIG. 6 is a timing chart for controlling motors of the facsimile system.

(i) When the reading system has another jam treatment structure (for example, the cover can be opened widely):

Upon completion of the copy mode or the sending mode, except for the operation of the above S21 in FIG. 6, the same operation as the copy mode of the first embodiment are effected (the operation of S21 is not effected). That is to say, the sheet supply/read motor 32 is stopped in a condition that the switching gear 33a is engaged by the gear w1 of the reading system, so that the switching gear 33a is prevented from engaging with the gear pulley wp1 of the sheet supply system.

Further, if the abnormity (such as sheet jam) occurs after or during the receiving mode, similar to the above-mentioned first embodiment, the sheet supply/read motor 32 is rotated by the predetermined amount to engage the switching gear 33a with the gear w1 of the reading system.

Consequently, since the load caused by the stopping torque of the sheet supply/read motor 32 does not act on the sheet supply roller 3, even if the sheet is jammed during the sheet supplying operation, the jammed recording sheet S can easily be pulled in the sheet supplying direction or in the opposite direction.

(ii) When the sheet supply system has another jam treatment structure:

After or during the copy mode or the sending mode, if the original is jammed, the motor 32 is rotated in the direction h to engage the gear 33a with the gear pulley wp1. Upon completion of the receiving mode, the motor 32 is stopped in the condition that the gear 33a is engaged by the gear pulley wp1.

THIRD EMBODIMENT

Next, a facsimile system according to a third embodiment of the present invention will be explained with reference to FIG. 7. Incidentally, elements having the same construction and function as those of the first embodiment are designated by the same reference numeral, and explanation thereof will be omitted.

Figure 7:
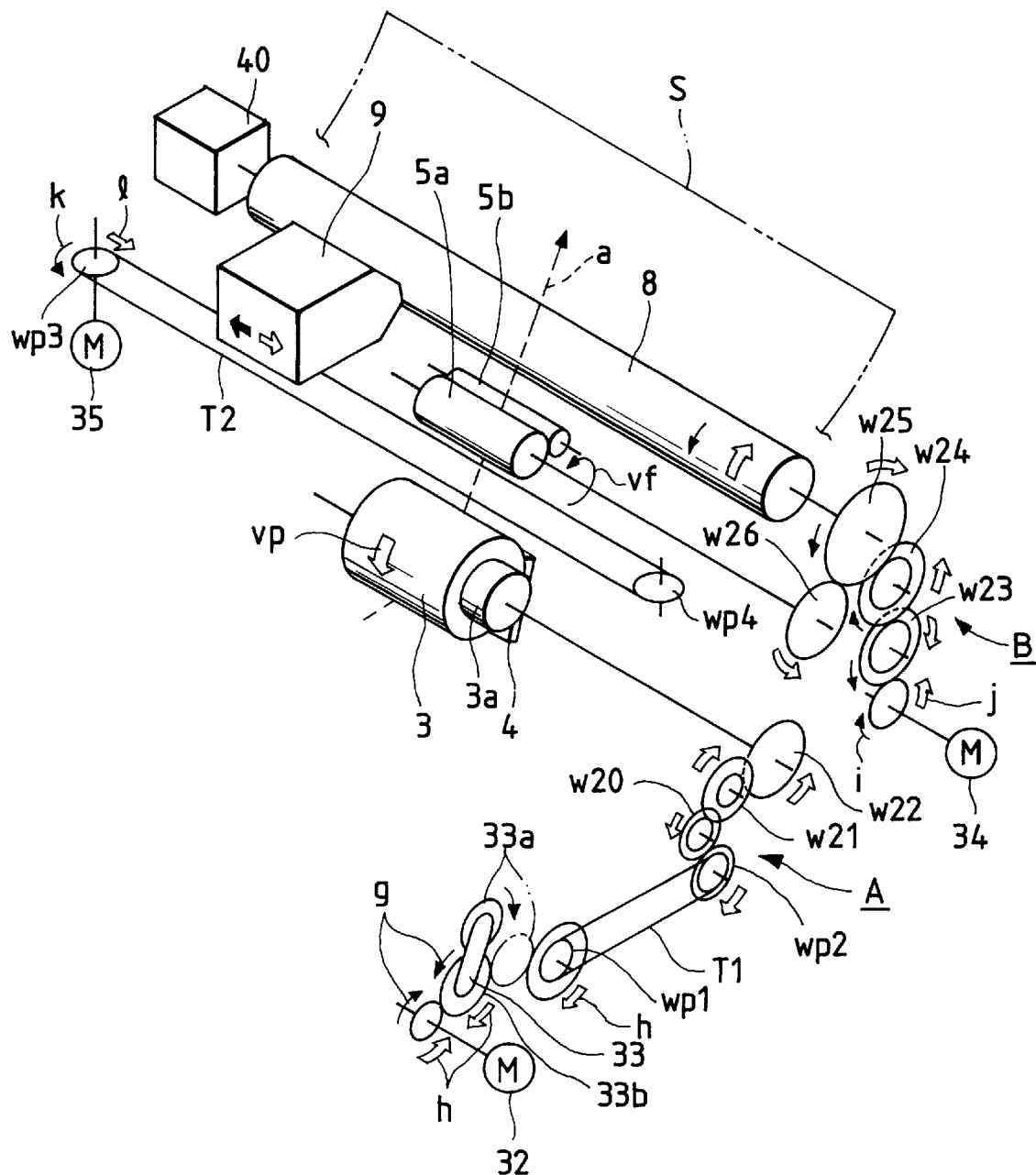
FIG. 7 is a schematic perspective view of a drive system of a recording portion according to a third embodiment of the present invention.

As shown in FIG. 7, the present invention can be applied to a recording portion of the facsimile system. That is to say, in the third embodiment, before the facsimile system is stopped, the drive motor or sheet supply/read motor 32 is rotated to shift the switching gear 33a to a position where the gear 33a is not engaged by the gear pulley wp1 of the sheet supply system. With this arrangement, since the load caused by the stopping torque of the sheet supply/read motor 32 does not act on the sheet supply roller 3, even if the sheet is jammed during the sheet supplying operation, the jammed recording sheet S can easily be pulled in the sheet supplying direction or in the opposite direction.

FOURTH EMBODIMENT

Next, a facsimile system according to a fourth embodiment of the present invention will be explained with reference to FIG. 8. Incidentally, elements having the same construction and function as those of the first embodiment are designated by the same reference numeral, and explanation thereof will be omitted.

Figure 8:
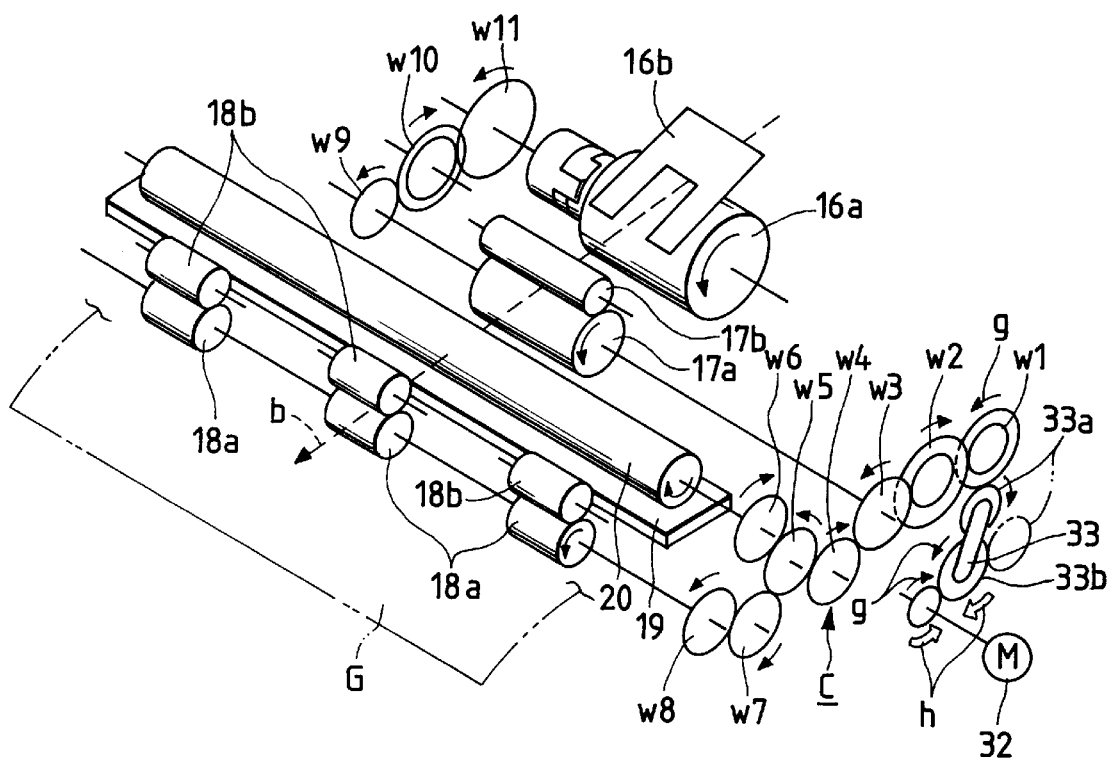
FIG. 8 is a schematic perspective view of a drive system of a reading portion according to a fourth embodiment of the present invention.

As shown in FIG. 8, the present invention can be applied to only a reading portion of the facsimile system. That is to say, in the fourth embodiment, before the facsimile system is stopped, the drive motor or sheet supply/read motor 32 is rotated to shift the switching gear 33a to a position where the gear 33a is not engaged by the gear w1 of the reading system C. With this arrangement, since the load caused by the stopping torque of the sheet supply/read motor 32 does not act on the sheet supply roller 3, even if the sheet is jammed during the sheet supplying operation, the jammed recording sheet S can easily be pulled in the sheet supplying direction or in the opposite direction.

FIFTH EMBODIMENT

Next, a facsimile system according to a fifth embodiment of the present invention will be explained with reference to FIG. 9. Incidentally, elements having the same construction and function as those of the first embodiment are designated by the same reference numeral, and explanation thereof will be omitted.

Figure 9:
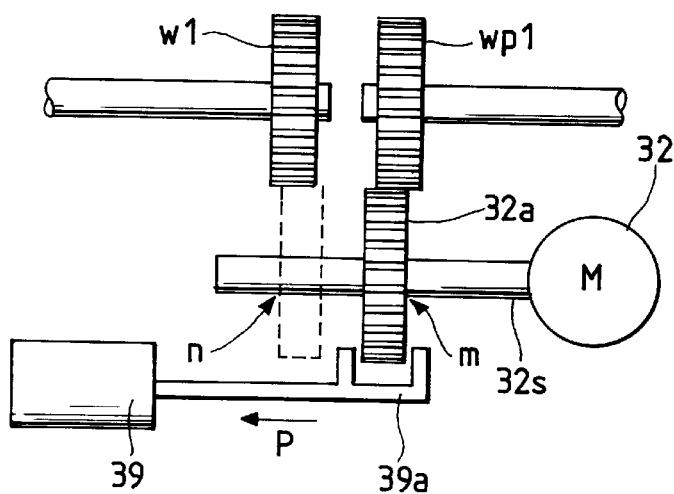
FIG. 9 is a partial view showing a main portion of a switching mechanism in a drive system according to a fifth embodiment of the present invention.

FIG. 9 is a front view of a switching means of a drive system according to the fifth embodiment. In this fifth embodiment, a gear change is effected by using a solenoid.

In FIG. 9, a spline or an axial groove is formed on an outer peripheral surface of an output shaft 32s of the sheet supply/read motor 32, and an output gear 32a is mounted on the output shaft so that the gear can be slid in a longitudinal direction (thrust direction) but cannot be rotated with respect to the output shaft. Further, a position of the output gear 32a in the thrust direction is controlled by an actuator 39a connected to a solenoid 39 so that, when the actuator 39a is shifted by the solenoid in a direction shown by the arrow p, the output gear 32a is shifted from a position m to a position n. Accordingly, when the output gear 32a is positioned at the position m, it is connected to the gear wp1 of the sheet supply system; whereas, when the output gear 32a is positioned at the position n, it is connected to the gear w1 of the reading system.

With this arrangement, by driving the solenoid 39, the sheet supply system can be switched or changed to the reading system without changing rotational direction of the motor 32.

Incidentally, in the above-mentioned embodiment, while an example that the gear of the drive motor is engaged with either the gear of the sheet supply system or the gear of the reading system by using the gear change effected by the solenoid was explained, the present invention is not limited to such an example, but, for example, the output gear of the drive motor may be shifted to a neutral position where the output gear is not engaged with both of the gears of the sheet supply system and the reading system.

OTHER EMBODIMENTS

In the above-mentioned embodiments, while the facsimile system having the ink jet printer was explained, a heat-transfer printer, a laser beam printer or other appropriate printer can be used in place of the ink jet printer.

Now, other embodiment of the present invention will be explained with reference to FIGS. 10 to 13. Incidentally, the same elements as those shown in FIG. 3 are designated by the same reference numerals.

Figure 10:
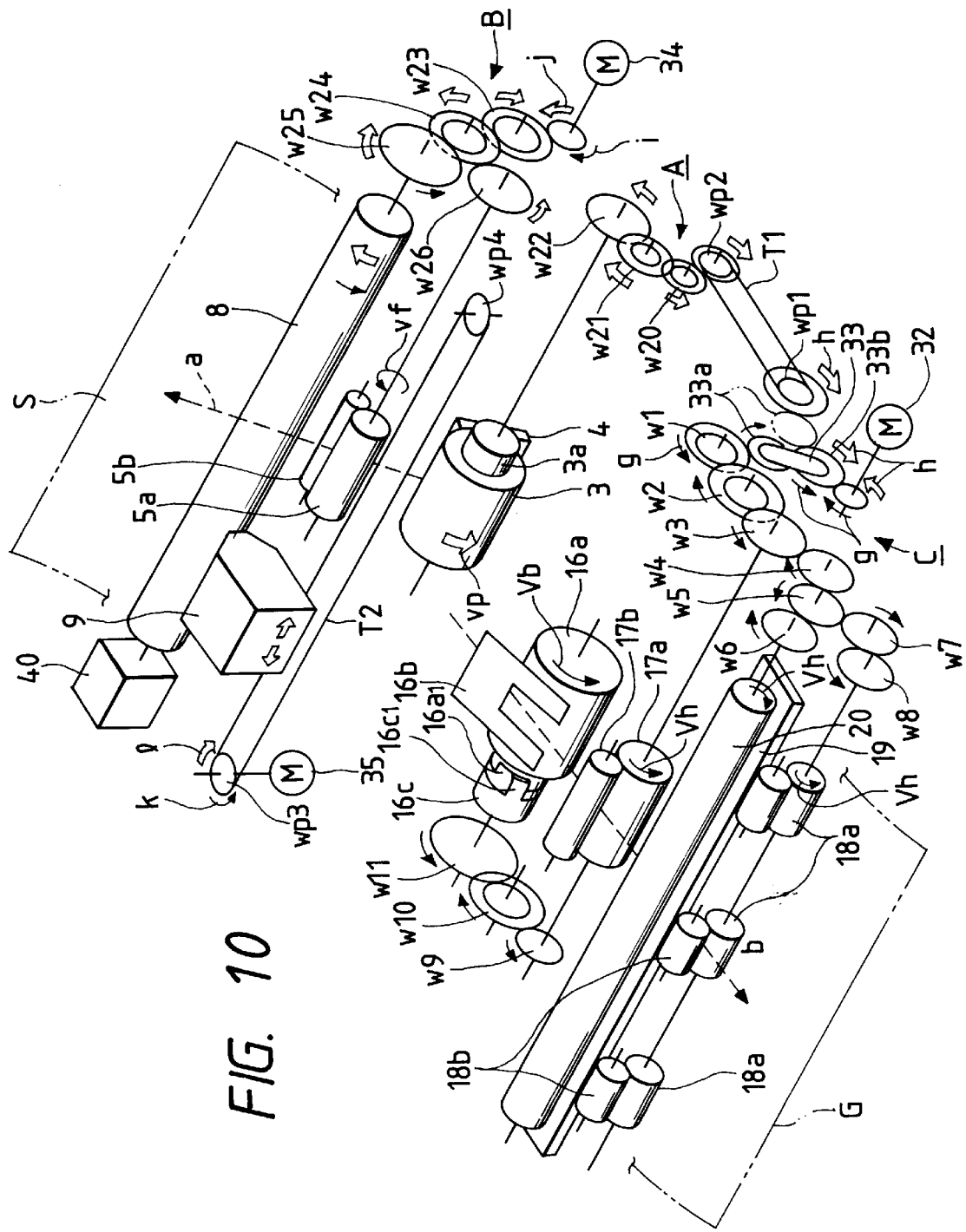
FIG. 10 is a perspective view showing a main portion of a facsimile system according to a further embodiment of the present invention.

As shown in FIG. 10, in the reading system C, a gear ratio between gears w9, w10, w11 of the reading system C are selected so that a relation between a peripheral speed Vh of each of the convey rollers 17a, 17b, discharge rollers 18a, 18b and white roller 20 (which serve to convey the original G) and a peripheral speed of the separation roller 16a becomes Vh>Vb. Further, a one-way clutch 16c is arranged between the separation roller 16a and a drive shaft on which the gear w11 is fixedly mounted, and a play is provided between the one-way clutch 16c and the separation roller 16a in the rotational direction so that a mechanical timer is defined by a projection 16c1 of the one-way clutch 16c and a recess 16a1 of the separation roller 16a.

Now, a distance between the originals (a distance between the rear end of the preceding original and the tip end of the succeeding original) determined by the original conveying system will be explained with reference to FIGS. 12A to 12F.

Figure 12A:
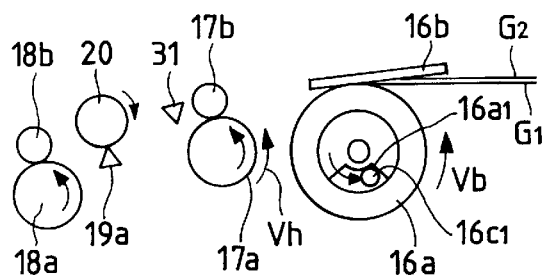
FIGS. 12A to 12F are views for explaining an original separating mechanism.

As shown in FIG. 12A, when two originals $G_1$, $G_2$ are inserted through an original insertion opening, the originals are pinched between the separation roller 16a and the urging piece 16b. Now, a coefficient $\mu_A$ of friction between the separation roller 16a and the original $G_1$, a coefficient $\mu_B$ of friction between the urging piece 16b and the original $G_2$, and a coefficient $\mu_C$ of friction between the originals G are selected to become $\mu_A > \mu_B > \mu_C$. As a result, when the separation roller 16a is rotated in a direction shown by the arrow, only the original (in this example, original $G_1$) contacted with the separation roller 16a having the greatest coefficient of friction can be supplied.

When the sheet supply/read motor 32 is rotated to drive the reading system C, the gears w1–w11 are driven to rotate the convey roller 17a, discharge roller 18a and white roller 20 in an original conveying direction (shown by the arrow b). At the same time, the drive shaft to which the gear w11 is fixedly mounted is also rotated in the original conveying direction, with the result that the one-way clutch 16c is locked to be driven in synchronous with the drive shaft. When the projection 16c1 of the one-way clutch 16c is abutted against one end wall of the recess 16a1 of the separation roller 16a, the driving force is transmitted to the separation roller 16a through the one-way clutch, thereby rotating the separation roller 16a in the original conveying direction. Consequently, as mentioned above, the first original $G_1$ is supplied selectively.

Figure 12B:
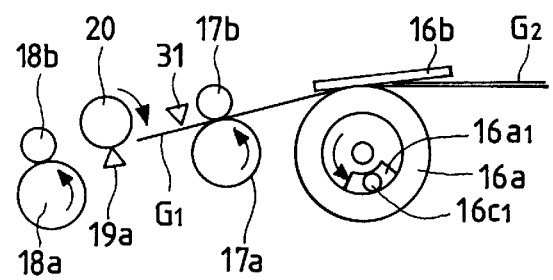

As shown in FIG. 12B, when the original $G_1$ reaches the convey roller 17a by rotating the separation roller 16a by the predetermined amount, since the peripheral speed Vh of the convey roller 17a is greater than the peripheral speed Vb of the separation roller 16a, the separation roller 16a is rotatingly driven by the movement of the original $G_1$. As a result, since the rotational speed of the separation roller 16a becomes greater than that of the one-way clutch 16c, the projection 16c1 of the one-way clutch 16c is gradually separated from the end surface of the recess 16a1 of the separation roller 16a, thereby increasing the space between the projection and the end surface gradually.

Figure 12C:
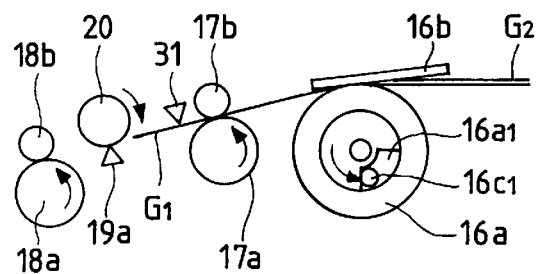

As shown in FIG. 12C, when the space is increased, the projection 16c1 of the one-way clutch 16c is abutted against the other end surface of the recess 16a1 of the separation roller 16a. As a result, since the one-way clutch 16a itself is driven in synchronous with the separation roller 16a to increase the rotational speed of the one-way clutch 16c more than that of the drive shaft, a clutch-free condition is established.

Figure 12D:
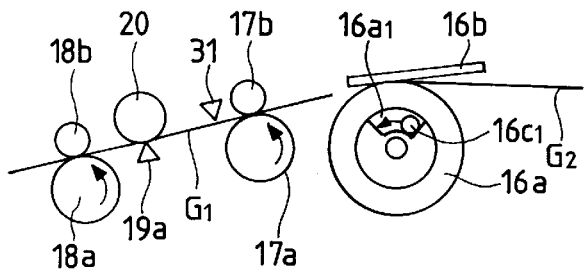

As shown in FIG. 12D, when the rear end of the first original $G_1$ is detached from the nip between the separation roller 16a and the urging piece 16b, the separation roller 16a is stopped. Consequently, the one-way clutch 16c (which was in the clutch-free condition) is locked again to be rotated together with the drive shaft.

Figure 12E:
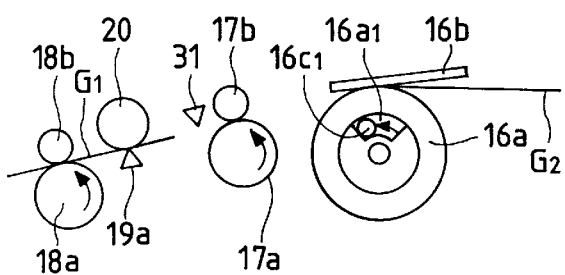

As shown in FIG. 12E, when the one-way clutch 16c is rotated by the predetermined amount, the projection 16c1 of the one-way clutch 16c (which was abutted against the other end surface of the recess 16a1 of the separation roller 16a) is abutted against the above-mentioned one surface of the recess 16a1 of the separation roller 16a as is in FIG. 12A, thereby transmitting the driving force to the separation roller. As a result, the separation roller 16a is rotated in the original conveying direction to supply the second original $G_2$.

Figure 12F:
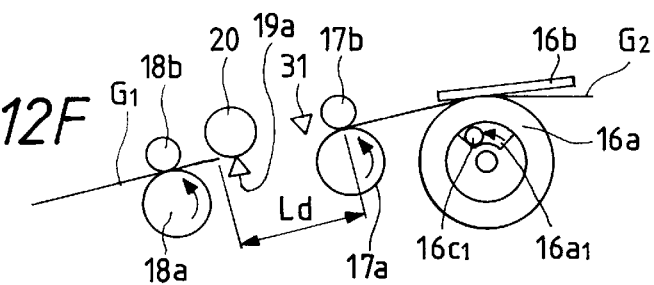

As shown in FIG. 12F, similar to the first original $G_1$, when the separation roller 16a is rotated again by the predetermined amount, the tip end of the second original $G_2$ reaches the convey roller 17a. In this case, since the rear end of the first original $G_1$ was conveyed by the predetermined amount from the convey roller 17a and at the same time the second original $G_2$ reaches the convey roller 17a, a predetermined distance Ld is created between the rear end of the first original $G_1$ and the tip end of the second original $G_2$. The distance Ld can be freely set by changing the reduction ratio between the convey roller 17a and the separation roller 16a (gear ratio between the gears w9–w11) and the play between the recess 16a1 of the separation roller 16a and the projection 16c1 of the one-way clutch 16c. Incidentally, in this embodiment, the distance Ld is set to be greater than a distance between the original tip/rear end sensor 31 and the reading position 19a of the photo electric conversion element 19.

According to the above embodiment (FIGS. 10–13), since the timer means having the predetermined play between the engagement portions is arranged between the original convey means and the power transmitting mechanism, deviation between the original and the reading position due to backlash generated during the drive changing operation can be prevented, thereby preventing the copied image from being deteriorated. That is to say, the reading area on the original and the read image can always be stabilized. Further, the same advantage can be obtained when the present invention is applied to the convey system for the recording sheet.

With the arrangement as mentioned above, since the original convey means and the recording sheet convey means are selectively driven by the single common drive motor, and since the original separation and convey means can separate and supply the originals one by one and can provide the constant distance between the originals being supplied, and since the distance between the originals is set to become greater than the distance between the original tip/rear end sensor and the original reading position, during the reading of the plurality of originals are read, at the time when the reading of the preceding original is finished, the succeeding original does not reach the original tip/rear end sensor. Thus, by using the control means for stopping the reading operation when the reading of the preceding original is finished, and then conveying the recording sheet, and then starting the reading operation again, a series of reading operations including the detection of the tip end of the original, the conveyance of the original to the reading position, the reading of the original, the detection of the rear end of the original and the conveyance of the rear end of the original to the reading position can be effected. As a result, even when the recording sheet is conveyed between the reading operations for two successive originals, the stable reading area of the original can always be ensured.

Next, in the above-mentioned facsimile system, operation of various motors when two originals G are continuously copied will be explained with reference to a timing chart shown in FIG. 13.

(S1): when two originals G are set on the original stacking plate 14, the original presence/absence sensor 30 detects the fact that the original is present, and a copy permitting condition or an original image sending permitting condition is established.

(S2): when the copy start is commanded from the operating portion D, the sheet supply/read motor 32 is rotated in the direction h, with the result that the sheet supply roller 3 is rotated to start the supply of the recording sheet. At the same time, the record motor 34 is rotated in the direction j to rotate the feed rollers 5a, 5b and the platen roller 8, thereby conveying the recording sheet S supplied from the sheet supply system A.

(S3): when the tip end of the sheet is detected by the recording sheet tip/rear end sensor 6, since the recording sheet S can be conveyed only by the record motor 34, the sheet supply/read motor 32 is stopped.

(S4): by conveying the recording sheet S by a predetermined amount after the tip end of the sheet was detected in S3, the registration of the recording sheet S with respect to the recording position is completed. At this point, the record motor 34 is stopped. Further, the sheet supply/read motor 32 is rotated in the direction g to start the separation of the originals G.

(S5): the tip end of the first original G is detected by the original tip/rear end sensor 31.

(S6): when the original G is conveyed by a predetermined amount after the tip end of the original was detected in S5, since the tip end of the original G reaches the reading position 19a of the photo-electric conversion element 19, the reading operation is started and the image signal is sent to the recording system B. When the image signal is received by the recording system B, the record motor 34 is rotated in the direction j to convey the recording sheet S; meanwhile, by rotating the carriage motor 35 in the normal and reverse directions alternately, the predetermined serial recording operation is effected by the head cartridge 9.

(S7): the rear end of the recording sheet S is detected by the sheet tip/rear end sensor 6.

(S8): the rear end of the first original G is detected by the original tip/rear end sensor 31.

(S9): when the rear end of the recording sheet S is conveyed by the predetermined amount to reach the recording position after the rear end of the recording sheet is detected in S7, the record motor 34 is stopped. Similarly, when the rear end of the first original G is conveyed by the predetermined amount to reach the reading position after the rear end of the original was detected in S8, the sheet supply/read motor 32 is stopped. In this case, the distance Ld is maintained between the rear end of the first original G and the tip end of the second original G.

(S10): similar to S2, the sheet supply/read motor 32 is driven to start the sheet supplying operation for the second recording sheet S. At the same time, the record motor 34 is driven to discharge the first recording sheet S and to convey the second recording sheet S supplied from the sheet supply system A.

(S11): similar to S3, when the tip end of the second recording sheet S is detected by the recording sheet tip/rear end sensor 6, since the recording sheet S can be conveyed only by the record motor 34, the sheet supply/read motor 32 (sheet supply system A) is stopped.

(S12): similar to S4, after the registration of the second recording sheet S is completed, the record motor 34 is stopped, and the sheet supply/read motor 32 is rotated in the direction g to convey the second original G and to discharge the first original G.

(S13): the tip end of the second original G is detected by the original tip/rear end sensor 31.

(S14): similar to S6, when the original G is conveyed by the predetermined amount after the tip end was detected in the above S13, since the tip end of the original G reaches the reading position 19a of the photo-electric conversion element 19, the reading operation is started, and the image signal is sent to the recording system B. When the recording system B receives the image signal, the record motor 34 is rotated in the direction j to convey the recording sheet S; meanwhile, by rotating the carriage motor 35 in the normal and reverse directions alternately, the predetermined serial recording operation is effected by the head cartridge 9.

(S15): similar to S7, the rear end of the second recording sheet S is detected by the sheet tip/rear end sensor 6.

(S16): the second original G is also conveyed, and the fact that there is no remaining original on the original stacking plate 14 is detected by the original presence/absence sensor 30.

(S17): similar to S8, the rear end of the second original G is detected by the original tip/rear end sensor 31.

(S18): similar to S9, when the rear end of the recording sheet S is conveyed by the predetermined amount to reach the recording position, the record motor 34 is stopped. When the rear end of the original G is conveyed by the predetermined amount to reach the reading position, the sheet supply/read motor 32 is stopped.

(S19): the record motor 34 is rotated in the direction j by the predetermined amount to discharge the rear end of the recording sheet S from the recording system B. At the same time, the sheet supply/read motor 32 is rotated in the direction g to discharge the rear end of the last original G.

(S20): the record motor 34 is rotated in the direction i by the predetermined amount, so that the recording head portion of the head cartridge 9 is cleaned by the cleaning device 40.

In accordance with the above-mentioned operations, the copy mode is carried out. On the other hand, in the sending mode, only the reading operation for reading the original G is effected. Thus, the sheet supply/read motor 32, original presence/absence sensor 30 and original tip/rear end sensor 31 are operated in the same manner as mentioned above, thereby carrying out the sending mode. On the other hand, in the receiving mode, only the supplying operation and the recording operation regarding the recording sheet S are effected. Thus, the sheet supply/read motor 32, record motor 34 and sheet tip/rear end sensor 6 are operated in the same manner as mentioned above, thereby carrying out the receiving mode.

OTHER EMBODIMENTS

In the above-mentioned embodiment, while an example that the sheet supply system and the reading system are driven by the common drive motor through the switching mechanism was explained, the present invention is not limited to such an example, but, for example, the reading system and the recording system may be selectively driven by a common drive motor.

Further, in the above-mentioned embodiment, while an example that the timer means having the predetermined play between the engagement portions is arranged between the original convey means and the power transmitting mechanism was explained, the present invention is not limited to such an example, but, for example, such a timer means may be arranged between the recording sheet convey means and its power transmitting mechanism.

Incidentally, FIG. 11 is a perspective view showing a positional relation between electric and electronic circuits in the facsimile system. In FIG. 11, a system substrate 21a of the facsimile system is arranged on a bottom surface 7g of the system body 7, and a power source unit substrate 21b is arranged at a right side portion of the system. Further, a substrate 21c for controlling the operating portion D, a relay substrate 21d, a substrate 21e for controlling the telephone and the telephone line, and a substrate 21f on which the printer interface 21f1 is mounted are arranged as shown, respectively. By providing these electronic circuit boards (substrates), the heat generating problem can be eliminated and the maintenance can be facilitated.

What is claimed is:

1. A sheet supply apparatus comprising:

reading means for reading an image on an original sheet;

supply means for supplying an original sheet to said reading means;

a drive motor for driving said supply means;

a power transmission switching mechanism for permitting or inhibiting transmission of power from said drive motor to said supply means;

control means for controlling an operation of said power transmission switching mechanism; and original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means;

wherein said power transmission switching mechanism is controlled to inhibit the transmission of power when a supplying operation is stopped.

2. A sheet supply apparatus according to claim 1, further comprising recording means for recording a predetermined image on a recording sheet, and said supply means constitutes a recording sheet supply means for supplying the recording sheet to said recording means.

3. A sheet supply apparatus according to claim 2, wherein said power transmission switching mechanism is a rockable and shiftable rotary member separated from a rotary member of said supply means when the operation is stopped.

4. A sheet supply apparatus according to claim 3, wherein said rockable rotary member is always engaged by a rotary member of said drive motor.

5. A sheet supply apparatus according to claim 4, wherein an arm is pivotally supported on a shaft of a rotary member of said drive motor, and said rockable rotary member is supported on the other end of said arm.

6. A sheet supply apparatus according to claim 2, wherein said power transmission switching mechanism is a means for relatively shifting a rotary member of said drive motor and a rotary member of said supply means in a thrust direction, and said rotary member of said supply means is separated from said rotary member of said drive motor when the operation is stopped.

7. A sheet supply apparatus according to claim 1, wherein said power transmission switching mechanism is a rockable and shiftable rotary member separated from a rotary member of said supply means when the operation is stopped.

8. A sheet supply apparatus according to claim 7, wherein said rockable rotary member is always engaged by a rotary member of said drive motor.

9. A sheet supply apparatus according to claim 8, wherein an arm is pivotally supported on a shaft of a rotary member of said drive motor, and said rockable rotary member is supported on the other end of said arm.

10. A sheet supply apparatus according to claim 1, wherein said power transmission switching mechanism is a means for relatively shifting a rotary member of said drive motor and a rotary member of said supply means in a thrust direction, and said rotary member of said supply means is separated from said rotary member of said drive motor when the operation is stopped.

11. A sheet supply apparatus comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means capable of selectively being engaged by a power transmitting mechanism of said recording sheet supply means;

a drive motor for driving said recording sheet supply means via said switching means;

original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and control means for controlling an operation of said switching means;

wherein said switching means is controlled in such a manner that said switching means is separated from said power transmitting mechanism of said recording sheet supply means when a supplying operation is stopped.

12. A sheet supply apparatus according to claim 11, wherein said power transmission switching means is a rockable and shiftable rotary member separated from a rotary member of said recording sheet supply means when the operation is stopped.

13. A sheet supply apparatus according to claim 12, wherein said rockable rotary member is always engaged by a rotary member of said drive motor.

14. A sheet supply apparatus according to claim 13, wherein an arm is pivotally supported on a shaft of a rotary member of said drive motor, and said rockable rotary member is supported on the other end of said arm.

15. A sheet supply apparatus according to claim 11, wherein said power transmission switching means is a means for relatively shifting a rotary member of said drive motor and a rotary member of said recording sheet supply means in a thrust direction, and said rotary member of said recording sheet supply means is separated from said rotary member of said drive motor when the operation is stopped.

16. A sheet supply apparatus comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means capable of selectively being engaged by a power transmitting mechanism of said original supply means;

a drive motor for driving said original supply means via said switching means;

original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and control means for controlling an operation of said switching means;

wherein said switching means is controlled in such a manner that said switching means is separated from said power transmitting mechanism of said original supply means when a supplying operation is stopped.

17. A sheet supply apparatus according to claim 16, wherein said power transmission switching means a rockable and shiftable rotary member separated from a rotary member of said original supply means when the operation is stopped.

18. A sheet supply apparatus according to claim 17, wherein said rockable rotary member is always engaged by a rotary member of said drive motor.

19. A sheet supply apparatus according to claim 18, wherein an arm is pivotally supported on a shaft of a rotary member of said drive motor, and said rockable rotary member is supported on the other end of said arm.

20. A sheet supply apparatus according to claim 16, wherein said power transmission switching means is a means for relatively shifting a rotary member of said drive motor and a rotary member of said original supply means in a thrust direction, and said rotary member of said original supply means is separated from said rotary member of said drive motor when the operation is stopped.

21. A facsimile system comprising:
reading means for reading an image on an original;
original supply means for supplying the original to said reading means;
recording means for recording an image on a recording sheet; and
recording sheet supply means for supplying the recording sheet to said recording means;
further comprising:
power transmission switching means capable of selectively being engaged by a power transmitting mechanism of said recording sheet supply means;
a drive motor for driving said recording sheet supply means via said switching means;
original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and
control means for controlling an operation of said switching means;
wherein said switching means is controlled in such a manner that said switching means is separated from said power transmitting mechanism of said recording sheet supply means when a supplying operation is stopped.

22. A facsimile system comprising:
reading means for reading an image on an original;
original supply means for supplying the original to said reading means;
recording means for recording an image on a recording sheet; and
recording sheet supply means for supplying the recording sheet to said recording means;
further comprising:
power transmission switching means capable of selectively being engaged by a power transmitting mechanism of said original supply means;
a drive motor for driving said original supply means via said switching means;
original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and
a control means for controlling an operation of said switching means;
wherein said switching means is controlled in such a manner that said switching means is separated from said power transmitting mechanism of said original supply means when a supplying operation is stopped.

23. A sheet supply apparatus comprising:
reading means for reading an image on an original;
original supply means for supplying the original to said reading means;
recording means for recording an image on a recording sheet; and
recording sheet supply means for supplying the recording sheet to said recording means;
further comprising:
power transmission switching means capable of selectively being engaged by a power transmitting mechanism of said original supply means or a power transmitting mechanism of said recording sheet supply means;
a drive motor for selectively driving said original supply means or said recording sheet supply means via said switching means;
original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and
control means for controlling an operation of said switching means;
wherein said switching means is controlled in such a manner that said switching means is shifted to a neutral position where said switching means is not engaged by both of said power transmitting mechanisms of said original supply means and said recording sheet supply means, when a supplying operation is stopped.

24. A sheet supply apparatus according to claim 23, wherein said power transmission switching means comprises a rockable rotary member shiftable between a rotary member of said recording sheet supply means and a rotary member of said original supply means, and said rockable rotary member is shifted to a neutral position between said rotary member of said recording sheet supply means and said rotary member of said original supply means when the operation is stopped.

25. A sheet supply apparatus according to claim 24, wherein said rockable rotary member is always engaged by a rotary member of said drive motor.

26. A sheet supply apparatus according to claim 25, wherein an arm is pivotally supported on a shaft of said rotary member of said drive motor, and said rockable rotary member is supported on the other end of said arm.

27. A sheet supply apparatus according to claim 23, wherein said power transmission switching means comprises a means for relatively shifting a rotary member of said drive motor, a rotary member of said original supply means and a rotary member of said recording sheet supply means in a thrust direction, and said rotary member of said drive motor is shifted to a neutral position between said rotary member of said recording sheet supply means and said rotary member of said original supply means when the operation is stopped.

28. A facsimile system comprising:
reading means for reading an image on an original;
original supply means for supplying the original to said reading means;
recording means for recording an image on a recording sheet; and recording sheet supply means for supplying the recording sheet to said recording means;

further comprising:

power transmission switching means capable of selectively being engaged by a power transmitting mechanism of said original supply means or a power transmitting mechanism of said recording sheet supply means;

a drive motor for selectively driving said original supply means or said recording sheet supply means via said switching means;

original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and control means for controlling an operation of said switching means;

wherein said switching means is controlled in such a manner that said switching means is shifted to a neutral position where said switching means is not engaged by both of said power transmitting mechanisms of said original supply means and said recording sheet supply means, when a supplying operation is stopped.

29. A sheet supply apparatus comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means capable of selectively being engaged by a power transmitting mechanism of said original supply means or a power transmitting mechanism of said recording sheet supply means;

a drive motor for selectively driving said original supply means or said recording sheet supply means via said switching means;

original tip/rear end detection means disposed between said reading means and said original supply means for detecting a tip end and a rear end of the original, and a distance between a rear end of a preceding original and a tip end of a succeeding original determined by said original supply means being greater than a distance between said reading means and said original tip/rear end detection means; and control means for controlling an operation of said switching means;

wherein said switching means is controlled in such a manner that said switching means is engaged by either said power transmitting mechanisms of said original supply means or said power transmitting mechanisms of said recording sheet supply means, when a supplying operation is stopped.

30. A sheet supply apparatus according to claim 29, wherein said power transmission switching means is a rockable rotary member shiftable between a rotary member of said recording sheet supply means and a rotary member of said original supply means, and said rockable rotary member is engaged by either said rotary member of said original supply means or said rotary member of said recording sheet supply means when the operation is stopped.

31. A sheet supply apparatus according to claim 30, wherein said rockable rotary member is always engaged by a rotary member of said drive motor.

32. A sheet supply apparatus according to claim 31, wherein an arm is pivotally supported on a shaft of said rotary member of said drive motor, and said rockable rotary member is supported on the other end of said arm.

33. A sheet supply apparatus according to claim 29, wherein said power transmission switching means is means for relatively shifting a rotary member of said drive motor, a rotary member of said original supply means and a rotary member of said recording sheet supply means in a thrust direction, and said rotary member of said drive motor is engaged by said rotary member of said original supply means and said rotary member of said recording sheet supply means when the operation is stopped.

34. A facsimile system comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means capable of being engaged by a power transmitting mechanism of said original supply means or a power transmitting mechanism of said recording sheet supply means;

a drive motor for selectively driving said original supply means or said recording sheet supply means via said switching means;

original tip/rear end detection means disposed between said reading means and said original supply means for detecting a tip end and a rear end of the original, a distance between a rear end of a preceding original and a tip end of a succeeding original determined by said original supply means being greater than a distance between said reading means and said original tip/rear end detection means; and control means for controlling an operation of said switching means;

wherein said switching means is controlled in such a manner that said switching means is engaged by either said power transmitting mechanism of said original supply means or said power transmitting mechanism of said recording sheet supply means, when a supplying operation is stopped.

35. A sheet supply apparatus comprising:

supply means for supplying a sheet;

a drive motor for driving said supply means;

a power transmission switching mechanism for permitting or inhibiting transmission of power from said drive motor to said supply means;

control means for controlling an operation of said power transmission switching mechanism; and a drive force transmitting mechanism which has timer means for transmitting drive force from said drive motor to said supply means after lapse of predetermined time period;

wherein said power transmission switching mechanism is controlled to inhibit the transmission of power when a supplying operation is stopped.

36. A sheet supply apparatus comprising:

supply means for supplying a sheet;

a drive motor for driving said supply means;

a power transmission switching mechanism movable between an engage position to transmit power of said drive motor to said supply means and a disengage position not to transmit power; and control means for controlling an operation of said power transmission switching mechanism;

wherein said power transmission switching mechanism is controlled by said control means to be moved to the disengage position automatically by receiving a stop signal when a supplying operation is stopped.

37. A sheet supply apparatus according to claim 36, further comprising reading means for reading an image on an original, and wherein said supply means constitutes an original supply means for supplying the original to said reading means.

38. A sheet supply apparatus according to claim 36, further comprising recording means for recording a predetermined image on a recording sheet, and wherein said supply means constitutes a recording sheet supply means for supplying the recording sheet to said recording means.

39. A sheet supply apparatus according to claim 36, wherein said power transmission switching mechanism is a rockable rotary member normally engaged by a rotary member of said drive motor, but is separated from a rotary member when the operation is stopped, and said drive motor rotates reversely.

40. A sheet supply apparatus according to claim 39, wherein an arm is pivotally supported on a shaft of a rotary member of said drive motor, and said rockable rotary member is supported on the other end of said arm.

41. A sheet supply apparatus comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means for selectively engaging one of a power transmitting mechanism of said recording sheet supply means or a power transmitting mechanism of said original supply means;

a drive motor for driving said recording sheet supply means or said original supply means via said switching means; and control means for controlling an operation of said switching means;

wherein said switching means is controlled by said control means to be disengaged from said power transmitting mechanism of said recording sheet supply means automatically by receiving a stop signal when a supply operation is stopped.

42. A sheet supply apparatus according to claim 41, wherein said power transmission switching means is a rockable rotary member normally engaged by a rotary member of said drive motor, but is separated from a rotary member when the operation is stopped, and said drive motor rotates reversely.

43. A sheet supply apparatus according to claim 42, wherein an arm is pivotally supported on a shaft of a rotary member of said drive motor, and said rockable rotary member is supported on the other end of said arm.

44. A sheet supplying apparatus according to claim 41, wherein said power transmission switching means engages with the power transmitting mechanism of said original supply means, but maintains engagement with the power transmitting mechanism of said original supply means if engaged when the supplying operation is stopped.

45. A sheet supply apparatus comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means for selectively engaging a power transmitting mechanism of said original supply means or a power transmitting mechanism of said recording sheet supply means;

a drive motor for driving said original supply means via said switching means; and control means for controlling an operation of said switching means;

wherein said switching means is controlled in such a manner that said switching means is disengaged from said power transmitting mechanism of said original supply means automatically by receiving a stop signal when a supply operation is stopped.

46. A sheet supply apparatus according to claim 45, wherein said power transmission switching means is a rockable rotary member normally engaged by a rotary member of said drive motor, but is separated from a rotary member when the operation is stopped, and said drive motor rotates reversely.

47. A sheet supply apparatus according to claim 46, wherein an arm is pivotally supported on a shaft of a rotary member of said driver motor, and said rockable rotary member is supported on the other end of said arm.

48. A sheet supplying apparatus according to claim 45, wherein said power transmission switching means engages with the power transmitting mechanism of said recording sheet supply means.

49. A sheet supply apparatus comprising:

reading means for reading an image on an original;

original supply means for supplying the original to said reading means;

recording means for recording an image on a recording sheet; and recording sheet supply means for supplying the recording sheet to said recording means;

further comprising:

power transmission switching means for selectively engaging a power transmitting mechanism of said original supply means or a power transmitting mechanism of said recording sheet supply means;

a drive motor for selectively driving said original supply means or said recording sheet supply means via said switching means; and control means for controlling an operation of said switching means;

wherein said switching means is controlled in such a manner that said switching means is shifted to a neutral position where said switching means is not engaged by both of said power transmitting mechanisms of said original supply means and said recording sheet supply means automatically by receiving a stop signal, when a supplying operation is stopped.

50. A sheet supply apparatus according to claim 49, wherein said power transmission switching means comprises a rockable rotary member shiftable between a rotary member of said recording sheet supply means and a rotary member of said original supply means, and normally is engaged by a rotary member of said drive motor, and said rockable rotary member is shifted to a neutral position between said rotary member of said recording sheet supply means and said rotary member of said original supply means when the operation is stopped, by a reverse rotation of said drive motor.

51. A sheet supply apparatus according to claim 50, wherein an arm is pivotally supported on a shaft of said rotary member of said drive motor, and said rockable rotary member is supported on the other end of said arm.

52. A sheer supply apparatus comprising:
  reading means for reading an image on an original;
  original supply means for supplying the original to said reading means;
  recording means for recording an image on a recording sheet; and
  recording sheet supply means for supplying the recording sheet to said recording means;
  further comprising:
    power transmission switching means for selectively engaging a power transmitting mechanism of said original supply means or a power transmitting mechanism of said recording sheet supply means;
    a drive motor for selectively driving said original supply means or said recording sheet supply means via said switching means; and
    control means for controlling an operation of said switching means;
  wherein said switching means is controlled in such a manner that said switching means is engaged by either said power transmitting mechanism of said original supply means or said power transmitting mechanism of said recording sheet supply means, automatically by receiving a stop signal when a supply operation is stopped.

53. A sheet supply apparatus according to claim 52, wherein said power transmission switching means is a rockable rotary member shiftable between a rotary member of said recording sheet supply means and a rotary member of said original supply means, and normally is engaged by a rotary member of said drive motor, and said rockable rotary member is engaged by either said rotary member of said original supply means or said rotary member of said recording sheet supply means when the operation is stopped by a reverse rotation of said drive motor.

54. A sheet supply apparatus according to claim 53, wherein an arm is pivotally supported on a shaft of said rotary member of said drive motor, and said rockable rotary member is supported on the other end of said arm.

55. A sheet supplying apparatus according to claim 52, wherein said power transmission switching means engages with the power transmitting mechanism of the openable one of said original supply means and said recording sheet supply means.

* * * * *

UNITED STATES PATENT AND TRADEMARK OFFICE
CERTIFICATE OF CORRECTION

PATENT NO. : 5,897,237

DATED : April 27, 1999

INVENTOR(S) : TAKESHI KONO

It is certified that error appears in the above-identified patent and that said Letters Patent is hereby corrected as shown below:

COVER PAGE [57] ABSTRACT,
Line 5, "and" should read --a controller--; and
Line 6, "means" should be deleted.

COLUMN 2,
Line 1, "Another" should read -- In another--.

COLUMN 3,
Line 46, "date." should read --data.--.

COLUMN 4,
Line 38, "D" should read --D is--.

COLUMN 5,
Line 38, "32" should read --32 is driven--.

COLUMN 8,
Line 14, "abnormity" should read --an abnormality--; and
Line 57, "abnormity" should read --abnormality--.

COLUMN 11,
Line 4, "in synchronous" should read --synchronously--;
Line 27, "in synchronous" should read --synchronously--;

UNITED STATES PATENT AND TRADEMARK OFFICE
CERTIFICATE OF CORRECTION

PATENT NO. : 5,897,237

DATED : April 27, 1999

INVENTOR(S): TAKESHI KONO

It is certified that error appears in the above-identified patent and that said Letters Patent is hereby corrected as shown below:

COLUMN 11
Line 42, "is" should be deleted.

Signed and Sealed this

Second Day of November, 1999

Q. TODD DICKINSON

*Attest:*

*Attesting Officer*    Acting Commissioner of Patents and Trademarks